United States Patent [19]

Okoshi

[11] Patent Number: 4,614,125
[45] Date of Patent: Sep. 30, 1986

[54] INFINITELY VARIABLE TRACTION ROLLER TRANSMISSION

[75] Inventor: Hideo Okoshi, Fujisawa, Japan

[73] Assignee: Nippon Seiko Kabushiki Kaisha, Tokyo, Japan

[21] Appl. No.: 778,169

[22] Filed: Sep. 19, 1985

Related U.S. Application Data

[63] Continuation of Ser. No. 531,267, Sep. 12, 1983, abandoned.

[51] Int. Cl.[4] .................. F16H 15/08; F16H 15/00
[52] U.S. Cl. ........................... 74/200; 74/190; 74/190.5
[58] Field of Search ............ 74/199, 200, 201, 190.5, 74/190

[56] References Cited

U.S. PATENT DOCUMENTS

| | | | |
|---|---|---|---|
| 1,698,229 | 1/1929 | Hayes | 74/200 |
| 2,086,491 | 7/1937 | Dodge | 74/285 |
| 2,907,220 | 10/1959 | Weisel | 74/200 |
| 3,142,189 | 7/1964 | Davis et al. | 74/200 |
| 3,810,398 | 5/1974 | Kraus | 74/200 |
| 4,434,676 | 3/1984 | Horton | 74/200 |
| 4,444,068 | 4/1984 | Kraus | 74/200 |
| 4,453,427 | 6/1984 | Kraus et al. | 74/200 |

Primary Examiner—Kenneth J. Dorner
Assistant Examiner—Michael D. Bednarek
Attorney, Agent, or Firm—Shapiro and Shapiro

[57] ABSTRACT

An infinitely variable traction roller transmission having a housing, an input shaft and an output shaft rotatably and coaxially supported on the housing, an input toric disc and an output toric disc fitted on the input and output shafts, respectively, and engaged with the shafts for rotation therewith, the opposed surfaces of the toric discs cooperating with each other to form a toroidal cavity, a plurality of traction rollers disposed in the toroidal cavity symmetrically with the axes of the input and output shafts, trunnion device rotatably supporting the traction rollers and supported by the housing for pivotal movement about a pivot axis perpendicular to the axis of rotation of the traction rollers, and pressing means for urging the input and output toric discs and the traction rollers against each other to bring them into engagement with each other and cause a traction force to be produced, is provided with a supporting device for mounting the trunnion devices on the housing for slight movement in the direction of the pivot axis, a screw device provided at the end of the pivot axis of the trunnion devices, and a speed change link mechanism provided on the screw device to rectilinearly move the trunnion devices in the direction of the pivot axis through the screw device.

4 Claims, 3 Drawing Figures

INFINITELY VARIABLE TRACTION ROLLER TRANSMISSION

This is a continuation application of Ser. No. 531,267 filed Sept. 12, 1983, now abandoned.

BACKGROUND OF THE INVENTION

1. Field of the Invention

This invention relates to an infinitely variable traction roller transmission in which the opposed surfaces of an input toric disc and an output toric disc provided on input and output shafts, respectively, disposed on the same axis cooperate with each other to form a toroidal cavity and traction rollers are disposed in the toroidal cavity and are engaged with the input and output toric discs so that a great torque is transmitted by a traction force created in the portion of engagement, and more particularly to an infinitely variable transmission which can continuously and smoothly accomplish the transmission ratio control of acceleration and deceleration by a small operating force and which is simple in structure and excellent in durability and moreover inexpensive.

2. Description of the Prior Art

Infinitely variable traction roller transmissions of the general type described above are known and various ones have been proposed. For example, the transmissions disclosed in U.S. Pat. Nos. 3,142,189 and 3,810,398 are provided with a hydraulic cylinder and a servo valve. In these transmissions, a trunnion rotatably supporting the traction rollers is displaced in the direction of a pivot axis by the hydraulic cylinder and as a result, pivotal movement of the trunnion about the pivot shaft is induced to vary the radii of the engagement circles of the traction rollers with the input and output toric discs and effect self-transmission action and also move the servo valve backwardly by the variation in the angle of pivotal movement of the trunnion, thereby returning the displacement in the direction of the pivot axis to a neutral position. However, the hydraulic servo mechanism is very complicated in structure and adjustment and requires a hydraulic source and particularly, the use of a servo valve is liable to cause hunting and also, such transmissions have been expensive and it has been difficult to make them compact and light in weight.

The transmission disclosed in U.S. Pat. No. 2,086,491 does not use a hydraulic pressure, but it uses a worm and a worm gear, a screw and a screw gear, a rack and a pinion, etc. to directly pivotally move the trunnion to thereby effect speed change. This transmission is not of the type in which the trunnion as previously mentioned is displaced in the direction of the pivot axis and thereby effects self speed change action, but is of the type in which the trunnion is forced to effect speed change and therefore, this transmission has required a great force for the speed changing operation and sudden speed change has been difficult with such device.

Also, in the transmission disclosed in U.S. Pat. No. 2,907,220, a support member rotatably supporting the traction rollers is supported by a ball screw device for movement in the direction of the pivot axis, and a great thrust load exerted on the traction rollers is directly exerted as a radial load on the ball screw, and this has offered a problem in respect of the durability of the ball screw and also, it has been impossible to make the bearing rotatably supporting the traction rollers large in size and this has also led to a problem in respect of the durability of the bearing.

SUMMARY OF THE INVENTION

The present invention eliminates all of the above-noted problems peculiar to the prior art. According to the present invention, a screw device is provided at the end of the pivot axis of trunnion devices and the screw device may be rotated to thereby move the trunnions slightly in the direction of the pivot axis and the automatic speed change action in which traction rollers rotate is induced in accordance with the amount of displacement of the trunnions, and by the rotation of the traction rollers, the trunnions are pivotally moved and the screw is rotated in reverse direction, whereby the displacement is returned to the original neutral position and thus, a speed change to a desired transmission ratio can be obtained.

The invention will hereinafter be described in detail with respect to embodiments thereof shown in the accompanying drawings.

DESCRIPTION OF THE PREFERRED EMBODIMENTS

Figure 1:
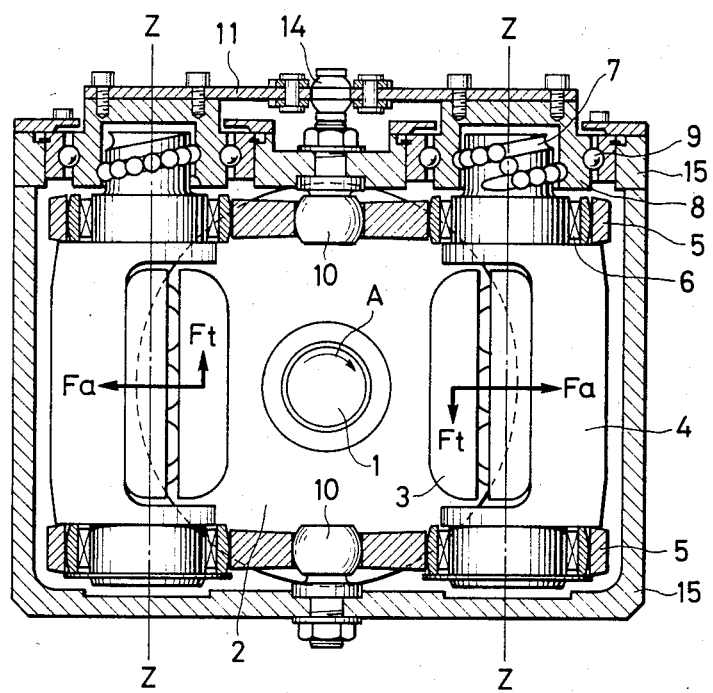
FIG. 1 is a transverse cross-sectional view illustrating an infinitely variable traction roller transmission of an embodiment of the present invention.

Referring to FIG. 1 which is a transverse cross-sectional view of an infinitely variable traction roller transmission of the present invention, an input toric disc 2 is fitted on an input shaft 1 shown as an end surface and is engaged by an engaging member, not shown, in a well-known manner so that they rotate together. Although not shown, an output shaft and an output toric disc are similarly provided on this side of FIG. 1.

Between the input toric disc 2 and the output toric disc, two left and right traction rollers 3 are rotatably supported on trunnions 4 and are engaged with the input and output toric discs while being urged against each other. The upper and lower ends of the trunnions 4 are held by tension members 5 through spherically outer-surfaced bearings 6, each of the tension members 5 having its central portion supported by a housing 15 through a spherical pole 10. Thus, the tension members are each rotatable about a pivot axis Z—Z and slightly movable in the direction of the axis Z—Z.

Figure 2:
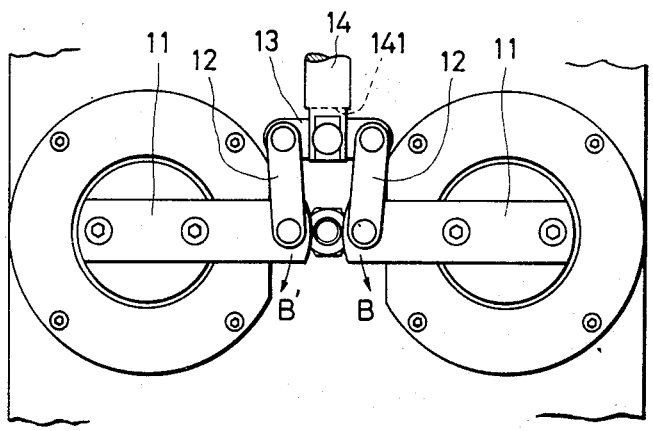
FIG. 2 is a plan view of the FIG. 1 embodiment.

The screw shaft 7 of a ball screw is formed on each shaft end of the trunnion 4 and a ball nut 8 is threadably engaged with the screw shaft 7 through balls. The ball nut 8 is rotatably and axially stationarily supported on the housing 15 by a bearing 9, and left and right opposed speed change levers 11 and 11 are mounted on the upper end of the ball nuts as shown in FIG. 2, one end of each of connecting levers 12 being pivotally supported on the end of each of the speed change levers 11 and 11. The other ends of the connecting levers 12 are connected together by a balance lever 13, and a speed change rod 14 is pivotally supported on the central portion of the balance lever 13, as shown. The angle of pivotal movement is limited by the balance lever 13 contacting the bifurcated shoulder 141 of the speed change rod 14.

In the embodiment of the present invention having such a construction, when the input shaft 1 is rotating as indicated by arrow A in FIG. 1, a traction force Ft and a thrust load Fa resulting from the engagement of the traction rollers 3 with the input toric disc 2 and the output toric disc (not shown) are exerted on the traction rollers 3, as shown, and the thrust load Fa is borne by the tension members 5 and, since the tension members 5 are supported by the spherical portions of the spherically outer-surfaced bearings 6 and the spherical pole 10, the left and right trunnions 4 can each move slightly in the direction of the pivot axis Z—Z while involving pivotal movement of the tension members. Accordingly, the thrust load Fa is not exerted on the screw shafts 7 of the screw device, the ball nuts 8 and the bearings 9, but only the traction force Ft acts on them. The direction of action of this traction force Ft is opposite at left and right and, when the rotation of the input shaft 1 is in the direction of arrow A as previously described, it produces a torque for rotating the right speed change lever 11 and the connecting lever 12 in the direction of arrow B and rotating the left speed change lever 11 and the connecting lever 12 in the direction of arrow B'. These left and right torques are balanced by the balance lever 13, that is, the left and right traction forces become equal to each other in magnitude. Also, the balance lever 13 can only pivotally move in the range of angle limited by the bifurcated shoulder 141 thereof, relative to the transmission rod 14, as previously described, the angles of rotation of the left and right speed change levers 11 do not become remarkably different and the balance between the left and right portions can be maintained by the left and right speed change levers.

Now, when the speed change rod 14 is vertically moved in FIG. 2, the speed change levers 11 and 11 rotate in opposite directions to move the left and right ball nuts 8 and 8 in reverse directions and each of the screw shafts 7 axially moves back and forth and accordingly, the left and right trunnions 4 and 4 move in opposite directions along the pivot axis Z—Z.

Thus, each of the traction rollers 3 is displaced in the direction of the pivot axis Z—Z and thereofore, the automatic transmission action in a well-known infinitely variable transmission occurs and the traction rollers 3 and accordingly, the trunnions 4 pivotally move about the pivot axis Z—Z, and the direction of the pivotal movement is such that it follows the rotation of the ball nuts 8 and therefore, as the screw shafts 7 lead, the trunnions 4 (the traction rollers 3) return to their original position and when they have returned to their neutral position, that is, when a condition in which the axis of rotation of the traction rollers 3 intersects the axis of the input and output shafts has been restored, the rotation of the traction rollers 3 is stopped. That is, the aforementioned automatic transmission action comes to an end and the speed can be changed to a desired transmission ratio corresponding to the amount of movement of the transmission rod 14.

The amount of displacement of the trunnions in the direction of the pivot axis Z—Z during speed change is very small and this displacement is remarkably enlarged at the ends of the speed change levers 11 through a screw device and therefore, the aforementioned traction force Ft is remarkably reduced at these end portions and accordingly, the operating force required to move the speed change rod 14 for speed change may be of a much smaller value as compared with a case where the shaft ends of the trunnions are directly pushed in the direction of the axis Z—Z to effect speed change.

Also, the pivotal movement of the trunnions 4 has a resistance caused by the urging force of the screws created by the traction force Ft being applied in the direction of the axis Z—Z, and the component of the traction force in the direction of speed change perpendicular to the traction force Ft created by the displacement of the trunnions 4 in the direction of the axis Z—Z overcomes the above-mentioned resistance to pivotally move the trunnions and thereby effect speed change and therefore, if the friction force of the screw device is great, smooth speed change cannot be expected in some cases, but if a ball screw structure is adopted as in the above-described embodiment, the low friction property thereof will succeed in reducing the pivotal movement resistance of the trunnion device and only the axial load (the traction force Ft) acts on the ball screws and any radial load which is harmful to the friction of the ball screws is not exerted on the ball screws and therefore, very smooth transmission action and durability can be expected. However, the present invention is not restricted to the ball screw device, but may also be a sliding screw device.

Figure 3:
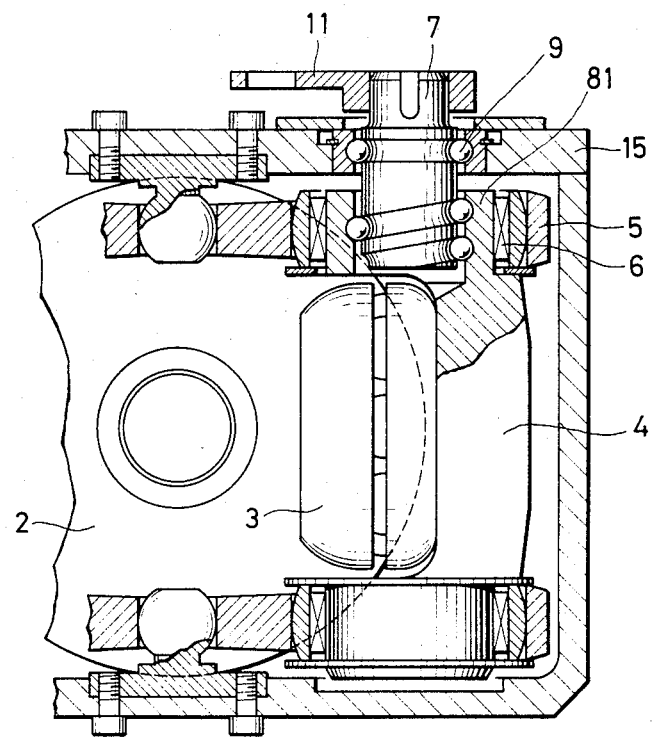
FIG. 3 is a transverse cross-sectional view showing the essential portions of another embodiment of the present invention.

In contrast with the above-described embodiment, an embodiment in which a ball nut which is a female screw is formed at 81 on a shaft end of each trunnion as shown in FIG. 3 and a threaded shaft 71 which is a male screw is rotatably and axially stationarily supported on the housing 15 through a bearing 9 and the speed change lever 11 is mounted on the threaded shaft 7 may result in a similar operation and effect.

The structure of the supporting device for mounting the trunnion devices on the housing for slight movement in the direction of the pivot axis Z—Z is neither restricted to the present embodiment, but may also be suspended, for example, by a spring device.

As described above, the transmission of the present invention does not employ a complex hydraulic servo mechanism and a hydraulic source or gears, but is of a simple structure simply using a screw device as a speed change link mechanism and therefore can be made compact and light in weight and thus provides a long-lived and inexpensive infinitely variable traction roller transmission. Particularly, it skillfully utilizes the automatic transmission action and can accurately and reliably obtain a desired transmission ratio by a small operating force and therefore greatly contributes to putting into practical use the infinitely variable traction roller transmission which has recently been attracting attention as a part of the remedy of fuel consumption of vehicles.

I claim:

1. An infinitely variable traction roller transmission having:
   a housing;
   input and output shafts rotatably and coaxially journaled to said housing;
   input and output toric discs mounted on said input and output shafts, respectively, so as to rotate together with said shafts in a transmission state;
   the opposed surfaces of said toric discs forming a toroidal cavity therebetween;
   traction rollers opposed to each other in said toroidal cavity symmetrically with the axis of the input and output shafts;
   trunnion devices supporting said traction rollers, respectively, rotatably about rotational axes perpendicular to respective stationary pivot axes of the trunnion devices which reside on a plane perpendicular to the axis of the input and output shafts, said rotational axes also residing on said plane and being perpendicular to the axis of the input and output shafts in an isochronous transmission state, support means for supporting the trunnion devices such that the traction rollers engage said input and output toric discs so as to generate traction forces on the traction rollers in the transmission state, said support means supporting the trunnion devices rotatably about the pivot axes and displaceably in the direction of the pivot axes;

screw devices provided on an axial end of the respective trunnion devices and threaded in the same direction, each of said screw devices comprising a male screw member, a female screw member and a plurality of balls interposed between grooves of said screw members, one of said screw members being formed on one of the trunnion devices, bearing means for supporting the other screw member on the housing rotatably about one of the pivot axes and fixedly in the direction of the pivot axes and for receiving said traction forces from the trunnion device;

a speed change link mechanism comprising a pair of speed change levers connected to the other screw members, respectively, for turning them, a pair of connecting levers having one end thereof pivotally supported on said speed change levers, respectively, a balance lever connecting the other ends of said connecting levers and having a central portion, and a speed change rod mounted on the central portion of said balance lever, said speed change link mechanism having means for effecting the rotation of the other screw members by forcing the speed change rod to move in a direction perpendicular to said plane by means of an outside force and for thereby causing the trunnion devices with the traction rollers to move axially oppositely to each other through the screw devices, and whereby said trunnion devices rotate about the pivot axes while returning to a position where the rotational axes of the traction rollers reside on said plane perpendicular to the axis of the input and output shafts so that the transmission may achieve a desired speed change ratio corresponding to the displacement of the speed change rod.

2. An infinitely variable transmission according to claim 1, wherein said support means comprises tension members engaging opposite ends of said trunnion devices by means of bearings having spherical outer surfaces, each tension member having a central portion supported on the housing by means of a spherical pole.

3. An infinitely variable transmission according to claim 1, wherein said one of said screw members is a male screw member and wherein said other screw member is a female screw member.

4. An infinitely variable transmission according to claim 1, wherein said one of said screw members is a female screw member and wherein said other of said screw members is a male screw member.

* * * * *